United States Patent
Wu et al.

(10) Patent No.: US 7,903,508 B2
(45) Date of Patent: Mar. 8, 2011

(54) SYSTEM AND METHOD FOR DETERMINING GROOVE/LAND SWITCHING POINTS OF AN OPTICAL DISC UTILIZING A MOTOR ROTATING SIGNAL AND ORIGINAL SWITCHING POINTS

(75) Inventors: Chang-Long Wu, I-Lan (TW); Meng-Hsueh Lin, Taipei County (TW); Ming-Jiou Yu, Taipei (TW)

(73) Assignee: MediaTek Inc., Science-Based Industrial Park, Hsin-Chu Hsien (TW)

( * ) Notice: Subject to any disclaimer, the term of this patent is extended or adjusted under 35 U.S.C. 154(b) by 1132 days.

(21) Appl. No.: 11/307,211

(22) Filed: Jan. 26, 2006

(65) Prior Publication Data

US 2007/0171799 A1    Jul. 26, 2007

(51) Int. Cl.
    G11B 7/00    (2006.01)
    G11B 5/52    (2006.01)
(52) U.S. Cl. ............... 369/44.26; 369/44.29; 369/53.3
(58) Field of Classification Search .............. None
    See application file for complete search history.

(56) References Cited

U.S. PATENT DOCUMENTS

| | | | |
|---|---|---|---|
| 4,663,751 A | 5/1987 | Kaku | |
| 4,695,993 A | 9/1987 | Takagi | |
| 5,299,915 A | 4/1994 | Dinh | |
| 5,523,990 A | 6/1996 | Chiba | |
| 5,623,468 A | 4/1997 | Takeda | |
| 5,822,263 A | 10/1998 | Campbell | |
| 5,848,050 A | 12/1998 | Nagasawa | |
| 5,867,474 A | 2/1999 | Nagasawa | |
| 6,055,218 A * | 4/2000 | Takeda et al. | 369/44.28 |
| 6,055,219 A | 4/2000 | Ho | |
| 6,088,307 A | 7/2000 | Fushimi | |
| 6,091,678 A | 7/2000 | Fushimi et al. | |
| 6,091,699 A * | 7/2000 | Nakane et al. | 369/275.3 |
| 6,172,961 B1 | 1/2001 | Tanoue | |
| 6,195,320 B1 | 2/2001 | Furumiya | |
| 6,215,759 B1 | 4/2001 | Tanoue | |
| 6,233,207 B1 | 5/2001 | Tanaka | |
| 6,259,658 B1 | 7/2001 | Tanoue | |

(Continued)

FOREIGN PATENT DOCUMENTS

| | | |
|---|---|---|
| EP | 1 329 883 A1 | 7/2003 |
| JP | 10198978 | 7/1998 |
| JP | 1130834 | 2/1999 |
| TW | 374898 | 11/1999 |
| TW | 408307 | 10/2000 |

(Continued)

Primary Examiner — Christopher R Lamb
(74) Attorney, Agent, or Firm — Winston Hsu; Scott Margo

(57) ABSTRACT

A system for determining groove/land (G/L) switching points of an optical disc is disclosed. The system includes a motor rotating signal generating apparatus, an detection apparatus, and a G/L switching point generating apparatus. The motor rotating signal generating apparatus is for sensing the rotation of a motor to generate a motor rotating signal with a period corresponding to the rotation of the optical disc. Also, the detection apparatus is used for receiving the motor rotating signal and an original G/L switching point signal and utilizing the motor rotating signal and the original G/L switching point signal to determine a location of an reproduced G/L switching point of the optical disc. The G/L switching point generating apparatus is for generating an reproduced G/L switching point signal according to the location of the reproduced G/L switching point determined by the detection apparatus.

28 Claims, 8 Drawing Sheets

U.S. PATENT DOCUMENTS

| | | |
|---|---|---|
| 6,298,033 B1 | 10/2001 | Tanoue |
| 6,333,902 B1 | 12/2001 | Shim |
| 6,459,667 B1 | 10/2002 | Iijima |
| 6,747,932 B1 | 6/2004 | Jeon |
| 7,433,283 B2 | 10/2008 | Wu |
| 2003/0058757 A1 | 3/2003 | Miyagawa |
| 2005/0002298 A1 | 1/2005 | Hou |
| 2005/0120261 A1 | 6/2005 | Lin |
| 2005/0157603 A1 | 7/2005 | Tseng |
| 2007/0211611 A1 | 9/2007 | Lin |

FOREIGN PATENT DOCUMENTS

| | | |
|---|---|---|
| TW | 419662 | 1/2001 |
| TW | 512330 | 12/2002 |
| TW | 200539117 | 12/2005 |

* cited by examiner

001 # SYSTEM AND METHOD FOR DETERMINING GROOVE/LAND SWITCHING POINTS OF AN OPTICAL DISC UTILIZING A MOTOR ROTATING SIGNAL AND ORIGINAL SWITCHING POINTS

BACKGROUND

The invention relates to a system and method for determining groove/land (G/L) switching points of an optical disc, and more particularly, to a system and method for determining G/L switching points of an optical disc according to a motor rotating signal and original G/L switching points.

Certain types of optical discs, such as DVD+RW optical discs, data are recorded in grooves. However, for other kinds of optical discs, such as DVD-RAM, data is recorded in both grooves and lands. Therefore, it is important for a servo system to determine grooves and lands accurately for disc such as the DVD-RAM type.

Please refer to FIG. 1. FIG. 1 shows a related art method for determining G/L switching points. U.S. Pat. No. 6,091,678 discloses a method for determining G/L switching points by utilizing an optical pick-up head signal 100 (that is, the envelope of the header field) to generate G/L switching points. As shown in FIG. 1, the rising edge and falling edge of a G/L switching point signal 102 indicates the G/L switching points. However, it is difficult to maintain the optical pick-up head signal 100 in a stable state, thus the determination of G/L switching points is usually inaccurate.

Additionally, U.S. Pat. No. 6,333,902 discloses another method for determining G/L switching points. The method includes decoding a PID (Physical Identification) and determines G/L switching points according to the $25^{th}$ through $27^{th}$ bits of the PID. However, this approach fails when the PID is decoded incorrectly.

SUMMARY

It is therefore one of the many objectives of the claimed disclosure to provide a system and method for determining G/L switching points of an optical disc according to a motor rotating signal with a period corresponding to the rotation of an optical disc. Compared with above-mentioned techniques, since the relation between a motor and an optical disc is fixed once the disc is clamped on the clamper, a much more accurate determination of G/L switching points may be obtained.

According to the claimed disclosure, a system for determining groove/land (G/L) switching points of an optical disc is disclosed. The system comprises a motor rotating signal generating apparatus, a detection apparatus, and a G/L switching point generating apparatus. The motor rotating signal generating apparatus is used for sensing the rotation of a motor to generate a motor rotating signal with a period corresponding to the rotation of the optical disc. Also, the detection apparatus, coupled to the motor rotating signal generating apparatus, is used for receiving the motor rotating signal and an original G/L switching point signal, and utilizing the motor rotating signal and the original G/L switching point signal to determine a location of an reproduced G/L switching point of the optical disc. Moreover, the G/L switching point generating apparatus, coupled to the detection apparatus, is used for generating an reproduced G/L switching point signal according to the location of the reproduced G/L switching point determined by the detection apparatus. The reproduced G/L switching point signal can be generated constantly and robustly because the relationship between read G/L switch point and spindle motor is fixed.

Preferably, the detection apparatus determines the location of the reproduced G/L switching point of the optical disc by dividing a disc sector corresponding to one period of the motor rotating signal into N regions, where N is a positive integer, and then selects a target region from the N regions according to the original G/L switching point to determine the location of the reproduced G/L switching point. Furthermore, the reproduced G/L switching point may be located in a header region of the target region.

Additionally, the detection apparatus may further adjusts the motor rotating signal according the target region and divides a disc sector corresponding to one period of the new motor rotating signal into Y regions, wherein Y is a positive integer. Preferably, the target region is a $k^{th}$ region in the N regions, an adjusted target region is an $m^{th}$ region in the Y regions, and m is less than k.

According to the claimed disclosure, a method for determining groove/land (G/L) switching points of an optical disc is disclosed. The method comprises: (a) sensing the rotation of a motor to generate a motor rotating signal, wherein the rotation of the optical disc corresponds to a period of the motor rotating signal; (b) utilizing the motor rotating signal and an original G/L switching point signal to determine a location of a reproduced G/L switching point of the optical disc; and (c) generating an reproduced G/L switching point signal according to the location of the reproduced G/L switching point.

Also, step (b) may further comprises dividing a disc sector corresponding to one period of the motor rotating signal into N regions, wherein N is a positive integer, and selecting a target region from the N regions according to the original G/L switching point to determine the location of the reproduced G/L switching point. Also, the reproduced G/L switching point may be located in a header region of the target region.

Moreover, the target region may be a $k^{th}$ region in the N regions, an adjusted target region may be an $m^{th}$ region in the Y regions, and m is less than k. Preferably, the adjusted target region is a leading region in the Y regions.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
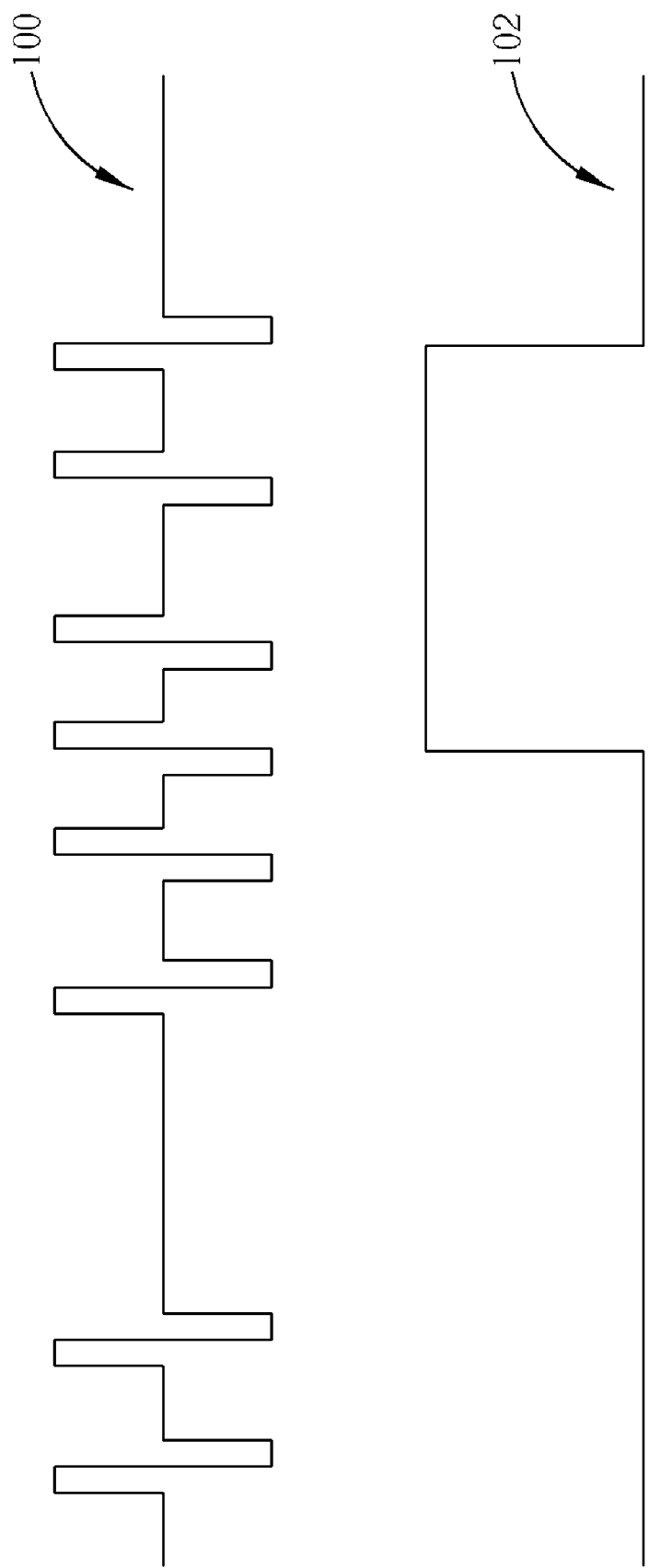
FIG. 1 is a schematic diagram of a related art method for determining G/L switching points.
Figure 2:
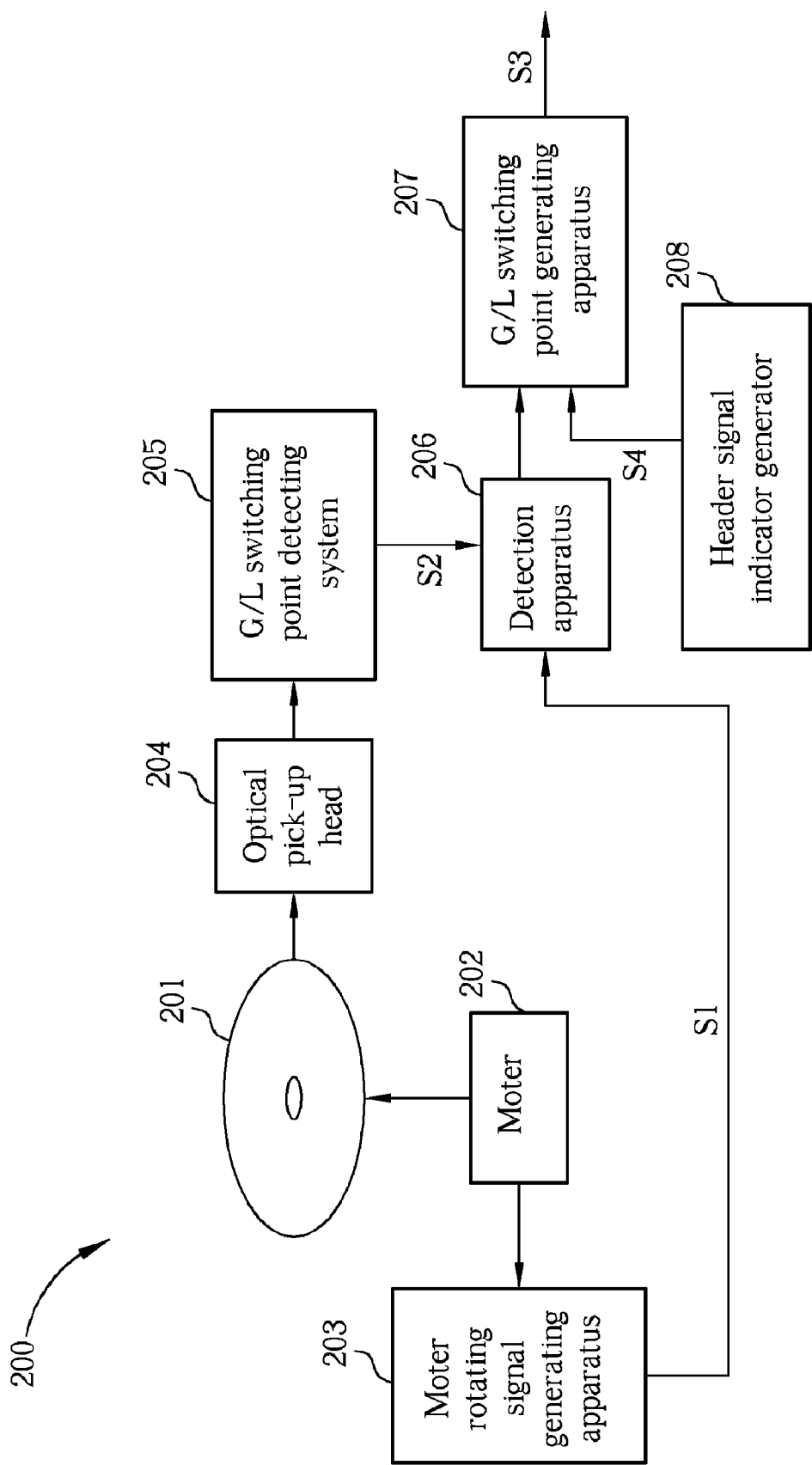
FIG. 2 is a diagram of a system for determining groove/land (G/L) switching points of an optical disc according to an embodiment of the present invention.

FIG. 2 is a block diagram of a system 200 for determining G/L switching points of an optical disc according to an embodiment. As shown in FIG. 2, the system 200 comprises an optical disc 201 (e.g., DVD-RAM disc), a motor 202, a motor rotating signal generating apparatus 203, an optical pick-up head 204, an original G/L switching point detecting system 205, an detection apparatus 206, and a G/L switching point generating apparatus 207. The motor 202 is used for rotating the optical disc 201, and motor rotating signal generating apparatus 203 is used for sensing the rotation of the motor 202 to generate a motor rotating signal S1 with a period corresponding to the rotation of the optical disc 201. In this embodiment, the motor rotating signal S1 corresponds to a rotation of the optical disc, but it doesn't mean to limit the scope of the present invention. The optical pick-up head 204 accesses information recorded on the optical disc 201, and then the original G/L switching point detecting system 205 detects G/L switching points of the optical disc 201 to generate an original G/L switching point signal S2. The detection apparatus 206, coupled to the motor rotating signal generating apparatus 203 and original G/L switching point detecting system 205, receives the motor rotating signal S1 and original G/L switching point signal S2 and then utilizes the motor rotating signal S1 and the original G/L switching point signal S2 to determine locations of reproduced G/L switching points of the optical disc 201. In this embodiment, the G/L switching point generating apparatus 207, coupled to the detection apparatus 206, is utilized to generate an reproduced G/L switching point signal S3 according to the location of the reproduced G/L switching point determined by the detection apparatus 206. It should be noted though the original G/L switching point signal S2 is generated using original G/L switching point detecting system 205 shown in FIG. 2, it doesn't mean that the original G/L switching point signal S1 is only generated by this means. In other words, other methods or apparatuses, which can generate the desired original G/L switching point signal S2 falls in the scope of this invention.

Figure 3:
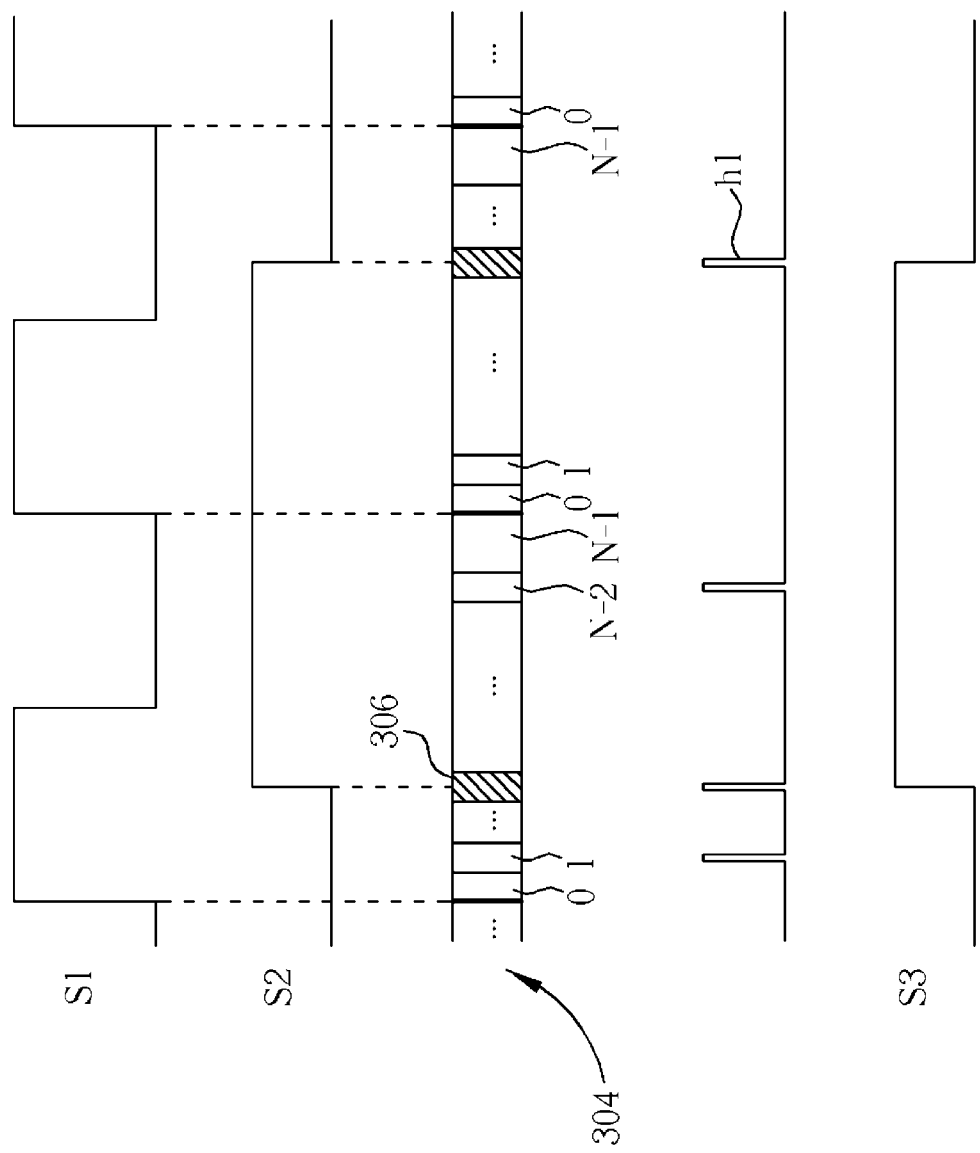
FIG. 3 is a schematic diagram illustrating operation of the system shown in FIG. 2 according to a first embodiment of the present invention.
Figure 4:
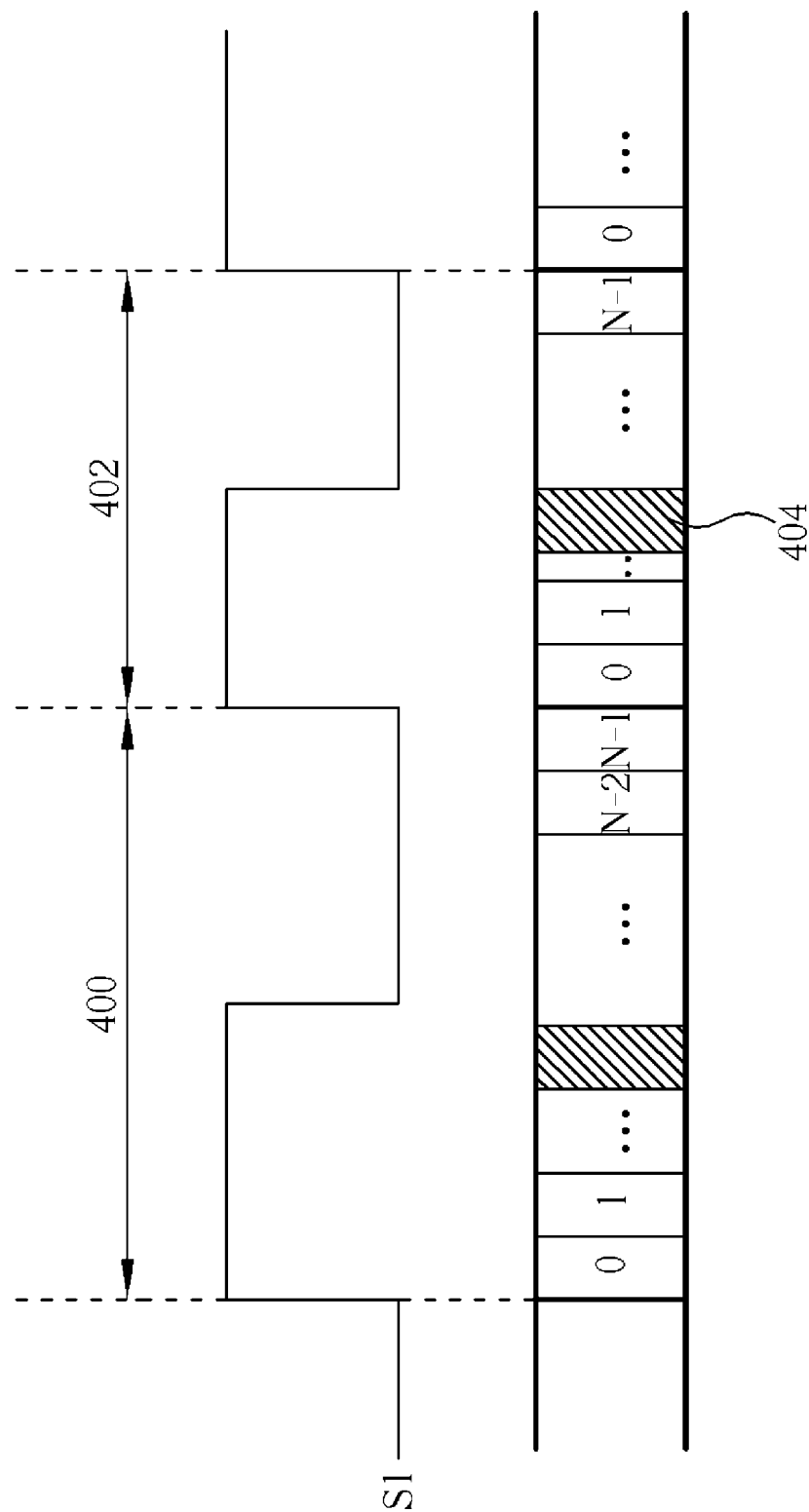
FIG. 4 is a schematic diagram illustrating operation of the system shown in FIG. 2 in a case that the motor speed increases.
Figure 5:
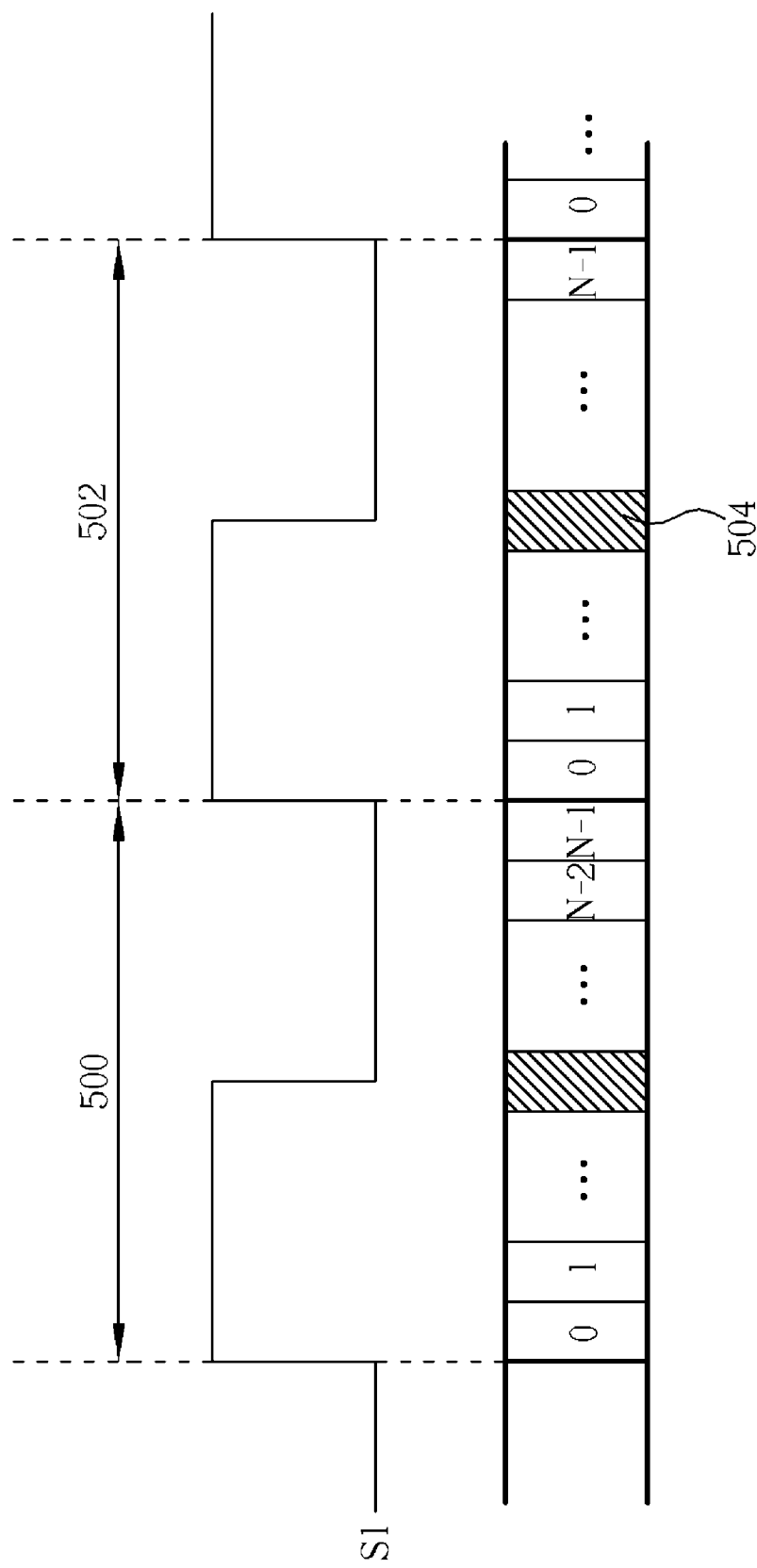
FIG. 5 is a schematic diagram illustrating operation of the system shown in FIG. 2 in a case that the motor speed decreases.

FIG. 3 is a schematic diagram illustrating operation of the system 200 shown in FIG. 2 according to a first embodiment. FIG. 4 and FIG. 5 are schematic diagrams illustrating operation of the system 200 shown in FIG. 2 in a case that motor speed changes. Please jointly refer to FIGS. 2 through 5 to understand this point more clearly. However, it should be noted that FIG. 2, FIG. 3, and the descriptions thereof are only some preferable examples illustrating how to generate reproduced G/L switching points according to original G/L switching points of an optical disc and the motor rotation signal, and are not meant to be limitations of the present disclosure.

As shown in FIG. 3, the detection apparatus 206 determines the location of the reproduced G/L switching point of the optical disc 201 by dividing a disc sector corresponding to one period of the motor rotating signal S1 into N regions 304, and selecting a target region 306 out of the N regions 304 according to the rising edge and falling edge of original G/L switching point signal S2 to determine the location of reproduced G/L switching point. Then, as described above, the G/L switching point generating apparatus 207 generates an reproduced G/L switching point signal S3 according the determined location of the reproduced G/L switching point.

In this case, the rising edge and falling edge of the original G/L switching point signal S2 indicate the original G/L switching points of the optical disc 201, the rising edge and falling edge of reproduced G/L switching point signal S3 indicate the reproduced G/L switching points, and the falling edges/rising edges of original G/L switching point signal S2 and reproduced G/L switching point signal S3 are both located in the same target region 306 marked by oblique lines. It should be noted that though original G/L switching point and reproduced G/L switching point are both located in the target region 306, but original G/L switching point is determined by unstable information such as header or PID and reproduced G/L switching point is determined by motor operation. Thus, the determination of reproduced G/L switching point according to this invention is more accurate than the original G/L switching point.

Preferably, reproduced G/L switching point may be located in a header region indicated by a header signal h1 to provide a more accurate result. In this case, N is selected to make the target region 306 have a single header region. Please note that the detection of the header regions is well known to those skilled in this art, and further description is omitted for brevity. Also, the system may further includes a header signal indicator generator 208 for generating a header signal indicator S4, and the G/L switching point generating apparatus 207 further refers to the header signal indicator S4 for generating the reproduced G/L switching points on the header regions.

Furthermore, when the motor speed changes, the detection apparatus 206 of the present disclosure is able to change the width and the location of the target region 306. As shown in FIG. 4, when the motor speed increases, the new period 402 of the motor rotating signal S1 becomes shorter than the original period 400, that is, time allowed for determining the reproduced G/L switching points decreases. Thus, to achieve greater accuracy in determining the reproduced G/L switching points, the detection apparatus 206, of the present disclosure, properly changes the location of the target region 404.

As shown in FIG. 5, when the motor speed decreases, the new period 502 of the motor rotating signal S1 is longer than the original period 500, that is, time allowed for determining the reproduced G/L switching points increases. Thus, to get achieve greater accuracy in determining the reproduced G/L switching points, the detection apparatus 206 adequately changes the location of the target region 504.

Figure 6:
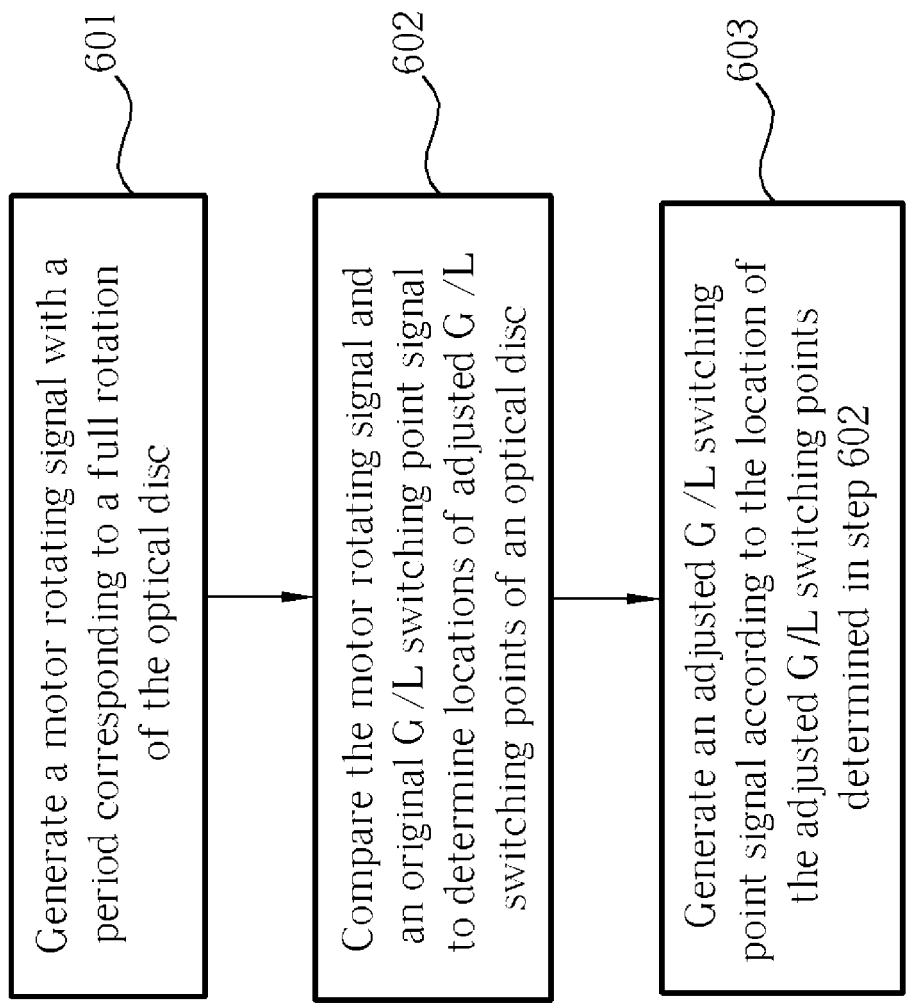
FIG. 6 is a flow chart of a method for determining G/L switching points of an optical disc according to a first embodiment of the present invention.

FIG. 6 is a flow chart of a method for determining G/L switching points of an optical disc according to a first embodiment. This method comprises the following steps:

Step 601: Detect the rotation of a motor to generate a motor rotating signal with a period corresponding to a rotation of the optical disc.

Step 602: Utilize the motor rotating signal and an original G/L switching point signal that indicates original switching points of an optical disc to determine location of reproduced G/L switching points of the optical disc.

Step 603: Generate an reproduced G/L switching point signal that indicates reproduced G/L switching points of an optical disc according to the location of the reproduced G/L switching points determined in step 602.

Step 602 may further comprises dividing a disc sector corresponding to one period of the motor rotating signal into N regions, where N is a positive integer, and selecting a target region from the N regions according to the original G/L switching point signal to determine the location of the reproduced G/L switching point, as shown in FIG. 3. In this case, step 602 may be repeated to generate a plurality of candidate regions accordingly, and then selecting the target region from the candidate regions. In this way, the determination of reproduced G/L switching points becomes more accurate.

Furthermore, in a second embodiment, after generating reproduced G/L switching points as described above, the detection apparatus 206 may further adjust the motor rotating signal S1 and the order of the target region in the divided regions of the disc sector corresponding to the motor rotating signal S1. In this way, the accuracy associated with the determination of reproduced G/L switching points, which are affected by changes of motor rotating speed, is greatly improved.

Figure 7:
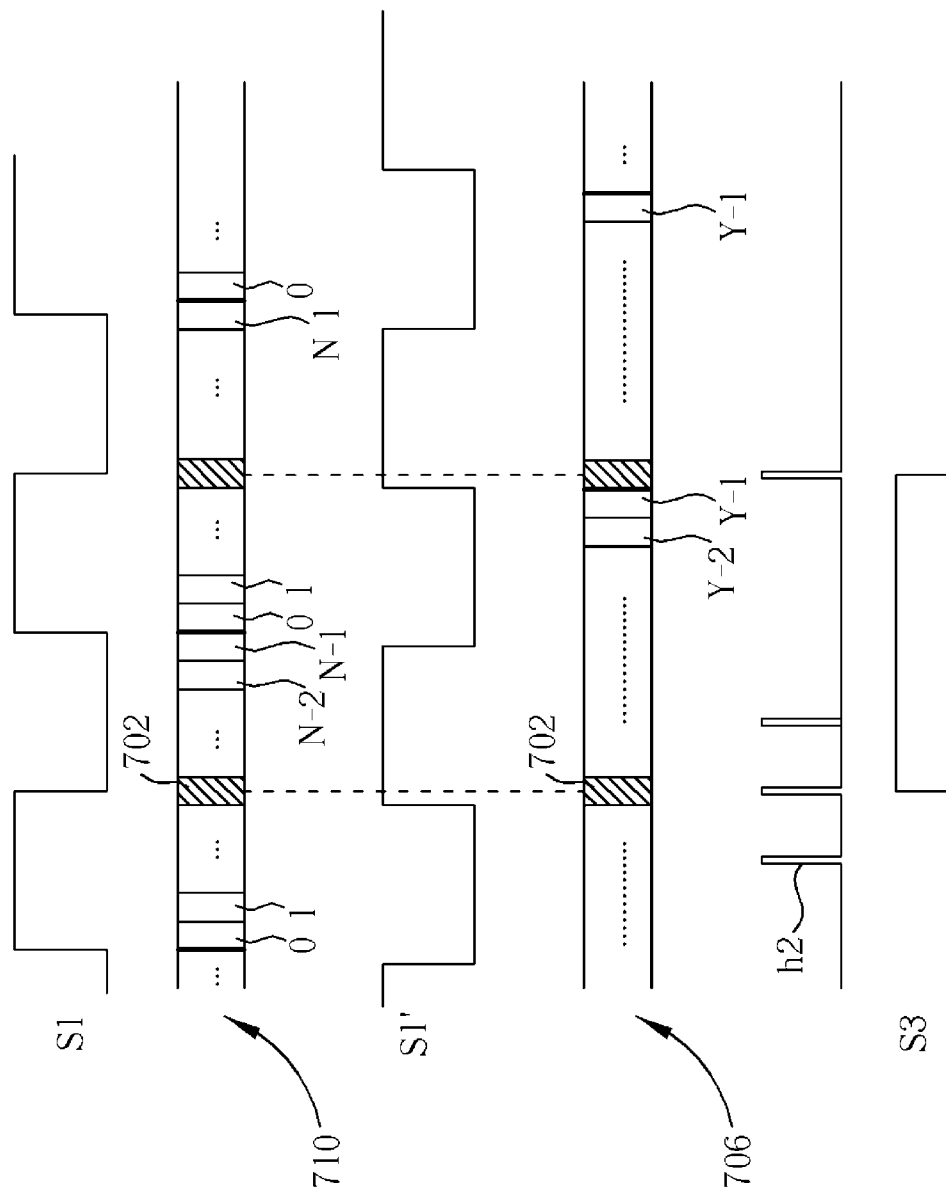
FIG. 7 is a schematic diagram illustrating operation of the system shown in FIG. 2 according to a second embodiment.

FIG. 7 is a schematic diagram illustrating operation of the system 200 shown in FIG. 2 according to a second embodiment. Please jointly refer to FIG. 2 and FIG. 7. As shown in FIG. 7, the detection apparatus 206 shifts the motor rotating signal S1 to form a new motor rotating signal S1' according to the target region 702 and divides a disc sector corresponding to one period of the motor rotating signal S1' into Y regions 706 (Usually, Y is equal to N). Also, the order of the target region in Y regions is prior to that in N regions 710. In this embodiment, the target region 702 is the leading region of Y regions 706. Then the reproduced G/L switching point is located at the target region 702. In the end, referencing the motor rotating signal S1', the G/L switching point generating apparatus 207 generates the desired reproduced G/L switching point signal S3. This method is used when the motor rotating signal is made with FG (Frequency Generation) signal which is generated from the Hall sensors on the motor. When we adjust the motor rotating signal to be closer to the edge of FG signal and then determine the reproduced G/L switch point, we can reduce the target region variation during speed-up/down motor.

Since some errors between divided regions of an optical disc sector corresponding to the motor rotating signal and the motor rotating signal may occur when the motor rotating speed changes and the error increases as the target region approaches the last region, the accuracy associated with the determination of reproduced G/L switching points, which are affected by changes of motor rotating speed, is improved by this means.

Similarly, reproduced G/L switching points may be located at header regions indicated by a header signal h2 to get a more accurate result. In this case, the value of Y is selected to make the target region 702 have a single header region. Also, the method may further include generating a header signal indicator (not shown), and further refers to the header signal indicator for generating the reproduced G/L switching points on the header regions.

Figure 8:
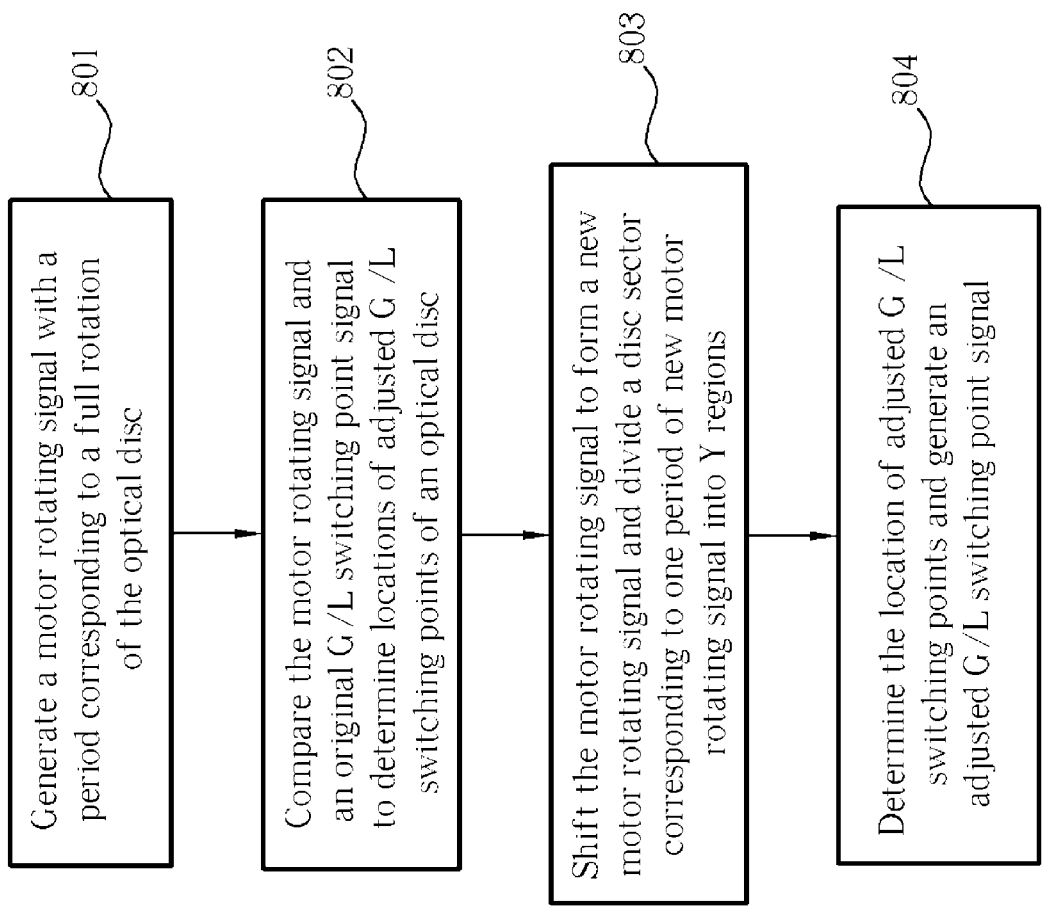
FIG. 8 is a flow chart of a method for determining G/L switching points of an optical disc according to the second embodiment.

FIG. 8 is a flow chart of a method for determining G/L switching points of an optical disc according to the second embodiment. The method comprises the following steps:

Step 801: Detect the rotation of a motor to generate a motor rotating signal with a period corresponding to a rotation of the optical disc.

Step 802: Utilize the motor rotating signal and an original G/L switching point signal, which indicates original G/L switching points of an optical disc to determine a location of an reproduced G/L switching point of the optical disc.

Step 803: Shift the motor rotating signal to form a new motor rotating signal according to the determined target region and dividing a disc sector corresponding to one period of new motor rotating signal into Y regions, wherein the order of target region in Y regions is prior to that in N regions.

Step 804: Determine the location of reproduced G/L switching points and generating an reproduced G/L switching point signal according to the location of the next reproduced G/L switching point.

Similarly, step 802 or step 804 may be repeated to generate a plurality of candidate regions accordingly, and then select the target region from the candidate regions. In this way, the determination of reproduced G/L switching points becomes more accurate.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A system for determining groove/land (G/L) switching points of an optical disc, comprising:
    a motor rotating signal generating apparatus, for sensing rotation of a motor to generate a motor rotating signal, wherein the rotation of the optical disc corresponds to a period of the motor rotating signal;
    a header signal indicator generator, generating a header signal indicator;
    a detection apparatus, receiving the motor rotating signal and an original G/L switching point signal, dividing a disc sector corresponding to one period of the motor rotating signal into N regions, selecting a target region out of the N regions according to the original G/L switching point to determine a location of a reproduced G/L switching point, and adjusting at least one of a width and a location of the target region according to a rotational speed of the motor, where N is a positive integer; and
    a G/L switching point generating apparatus, generating a reproduced G/L switching point signal by referring to both of the location of the reproduced G/L switching point and the header signal indicator.

2. The system of claim 1, wherein the detection apparatus repeats the determination of a region corresponding to an original G/L switching point indicated by the original G/L switching point signal to generate a plurality of candidate regions accordingly, and then selects the target region from the candidate regions.

3. The system of claim 1, wherein the reproduced G/L switching point is located in a header region of the target region.

4. The system of claim 3, wherein N is selected to make the target region have a single header region.

5. The system of claim 1, wherein the optical disc is a DVD-RAM disc.

6. The system of claim 1, wherein the detection apparatus determines a location of one reproduced G/L switching point in each of a plurality of successive periods of the motor rotating signal.

7. A system for determining groove/land (G/L) switching points of an optical disc, comprising:
    a motor rotating signal generating apparatus, for sensing rotation of a motor to generate a motor rotating signal, wherein the rotation of the optical disc corresponds to a period of the motor rotating signal;
    a detection apparatus, receiving the motor rotating signal and an original G/L switching point signal, dividing a disc sector corresponding to one period of the motor rotating signal into N regions, selecting a target region out of the N regions according to the original G/L switching point to determine a location of a reproduced G/L switching point, and adjusting the motor rotating signal according to the target region and dividing a disc sector corresponding to one period of the new motor rotating signal into Y regions, where N and Y are respectively positive integers; and a G/L switching point generating apparatus, generating a reproduced G/L switching point signal according to the location of the reproduced G/L switching point.

8. The system of claim 7, wherein the detection apparatus adjusts the motor rotating signal when a rotational speed of the motor changes.

9. The system of claim 7, wherein the target region is a $k^{th}$ region in the N regions, an adjusted target region is an $m^{th}$ region in the Y regions, and m is less than k.

10. The system of claim 9, wherein the detection apparatus determines at least one of a width and a location of the adjusted target region according to a rotational speed of the motor.

11. The system of claim 10, wherein the adjusted target region is a leading region in the Y regions.

12. The system of claim 10, wherein the new reproduced G/L switching point is located in a header region of the adjusted target region.

13. The system of claim 12, wherein Y is selected to make the adjusted target region have a single header region.

14. The system of claim 12 further comprising a header signal indicator generator for generating a header signal indicator, wherein the G/L switching point generating apparatus further refers to the header signal indicator when generating the reproduced G/L switching point signal.

15. A method for determining groove/land (G/L) switching points of an optical disc, comprising:
  (a) sensing rotation of a motor to generate a motor rotating signal, wherein the rotation of the optical disc corresponds to a period of the motor rotating signal;
  (a1) generating a header signal indicator;
  (b) dividing a disc sector corresponding to one period of the motor rotating signal into N regions, and selecting a target region from the N regions according to an original G/L switching point to determine a location of a reproduced G/L switching point, where N is a positive integer;
  (c) generating a reproduced G/L switching point signal by referring to both of the location of the reproduced G/L switching point and the header signal indicator; and
  (d) adjusting at least one of a width and a location of the target region according to a rotational speed of the motor.

16. The method of claim 15, wherein step (b) further comprises repeating the determination of a region corresponding to an original G/L switching point indicated by the original G/L switching point signal to generate a plurality of candidate regions accordingly, and then selecting the target region from the candidate regions.

17. The method of claim 15, wherein the reproduced G/L switching point is located in a header region of the target region.

18. The method of claim 17, wherein N is selected to make the target region have a single header region.

19. The method of claim 15, wherein the optical disc is a DVD-RAM disc.

20. The method of claim 15, wherein step (b) determines a location of one reproduced G/L switching point in each of a plurality of successive periods of the motor rotating signal.

21. A method for determining groove/land (G/L) switching points of an optical disc, comprising:
  (a) sensing rotation of a motor to generate a motor rotating signal, wherein the rotation of the optical disc corresponds to a period of the motor rotating signal;
  (b) dividing a disc sector corresponding to one period of the motor rotating signal into N regions, and selecting a target region from the N regions according to the original G/L switching point to determine a location of a reproduced G/L switching point, where N is a positive integer;
  (c) generating a reproduced G/L switching point signal according to the location of the reproduced G/L switching point; and
  (d) adjusting the motor rotating signal according to the target region and dividing a disc sector corresponding to one period of the new motor rotating signal into Y regions, where Y is a positive integer.

22. The method of claim 21, wherein the motor rotating signal is adjusted when a rotational speed of the motor changes.

23. The method of claim 21, wherein the target region is a $k^{th}$ region in the N regions, an adjusted target region is an $m^{th}$ region in the Y regions, and m is less than k.

24. The method of claim 23 further comprising adjusting at least of a width and a location of the adjusted target region according to a rotational speed of the motor.

25. The method of claim 24, wherein the adjusted target region is a leading region in the Y regions.

26. The method of claim 23, wherein the new reproduced G/L switching point is located in a header region of the adjusted target region.

27. The method of claim 26, wherein Y is selected to make the adjusted target region have a single header region.

28. The method of claim 26 further comprising generating a header signal indicator, wherein the reproduced G/L switching point signal is generated according to the header signal indicator.

* * * * *